Jan. 24, 1961
A. BRANDT
2,969,496
CONTACTOR TYPE RECTIFIER
Filed Dec. 2, 1957
2 Sheets-Sheet 1
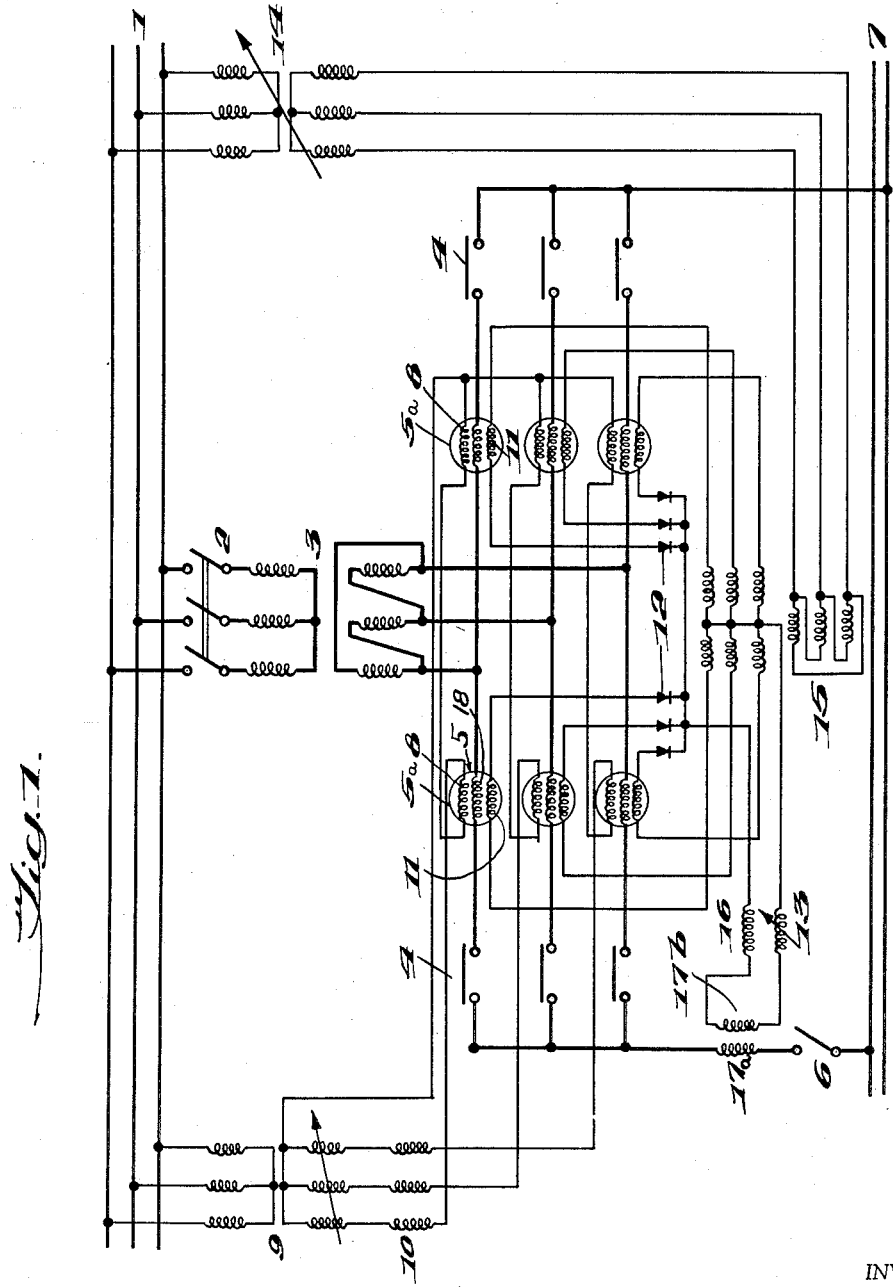
INVENTOR
*Armand Brandt*
BY *Pierce, Scheffler & Parker*
ATTORNEYS

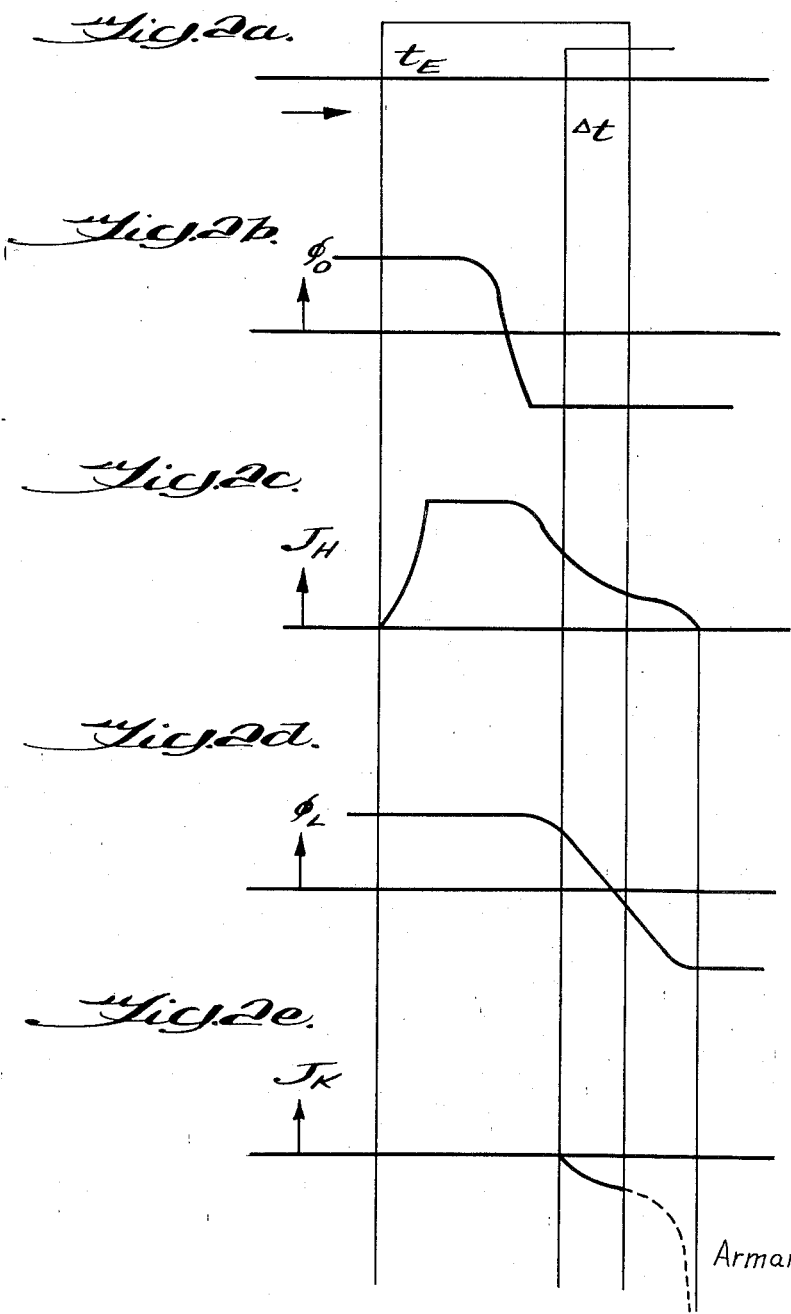

United States Patent Office 2,969,496
Patented Jan. 24, 1961

2,969,496
CONTACTOR TYPE RECTIFIER

Armand Brandt, Wettingen, Switzerland, assignor to Aktiengesellschaft Brown, Boveri & Cie, Baden, Switzerland, a joint-stock company Filed Dec. 2, 1957, Ser. No. 700,149

Claims priority, application Switzerland Dec. 4, 1956

5 Claims. (Cl. 321—48)

This invention relates to rectifying apparatus and more particularly to rectifiers or converters of the mechanical type wherein polyphase alternating current is converted to direct current to supply a direct current load by means of contactors actuated periodically in timed relation with the periodic changes in the alternating current.

Normally the contactors of converters of this type are so arranged that the contacts are opened and closed when the phases of the alternating current waves pass through the zero points in their respective cycles. To improve the operating characteristics of these converters, it is the practice to insert switching impedance devices in circuit between the contactors and the source of alternating current to be converted to direct current. Such impedance devices are of the magnetic choke type and the magnetic circuits thereof are normally saturated during the major portion of the alternating current cycle. When in a saturated condition, the impedance devices have a very small reactance value and therefore constitute a low impedance which permits the current being converted to pass through them practically unrestricted. However, when the alternating current is in the vicinity of the zero point, the current through the coils of impedance devices becomes sufficiently low to unsaturate the associated magnetic circuit with the result that the impedance of the coils rises abruptly thus bringing about a sharp step-like reduction in the current, or low current interval during the time that the contactors are open, and this serves to prevent arcing of the contactors as they open. The time at which the low current interval occurs in relation to the alternating current cycle and the slope of the step current depends upon a bias magnetization factor in the magnetic circuits of the switching impedance devices and which factor is produced by a biasing coil which is pre-energized with an alternating current having a phase position in relation to the alternating current cycle which can be regulated by induction principles.

Decisive for the formation of the low current interval is always the contactor current and thus the load current, since the contactor current prevents magnetic reversal of the switching impedance device by the exciting current, and effects it itself in its zero passage. However, if the load current drops to zero, the magnetic reversal of the switching impedance device is effected by the bias magnetization before the contactor breaks the circuit and even before the continuity maintaining contactor of another phase of the alternating current supply is closed. During the overlapping period of contactors of different phases of the alternating current supply, the switching impedance device is thus already saturated, so that a short-circuit current is generated by both contactors which can no longer be interrupted by the disconnecting contactor. This leads to destruction of the contactors.

To eliminate this undesirable condition, it has been known to load the converter additionally with a base or dummy load resistance which permits enough current to flow through the contactors, even when the actual direct current load decreases, so that a satisfactory commutation of the contactor currents and the operative magnetic reversal of the switching impedance device would be ensured. However, a base or dummy load imposes an unproductive load factor on the converter system and hence results in a reduction in efficiency. To eliminate this disadvantage, it was known to provide a switching device for the base or dummy load which connected it in circuit with the contactors only when the actual direct current load had dropped to a predetermined value. Even when the actual load is disconnected, the base or dummy load resistance must first be connected. This has the disadvantage, however, that the release time is increased when the direct current switch is disconnected, for example, during voltage drops in the primary mains. Considering such cases, it is thus necessary to leave the dummy load resistance permanently connected and to tolerate operation at a reduced efficiency.

The present invention has for its object to avoid the prior disadvantages incurred with use of a dummy load resistance and the desired result is accomplished by providing an additional exciting circuit on each of the switching impedance devices, the dummy load resistances being connected in these additional exciting circuits through rectifiers. Due to the current flowing in the rectifiers, the switching impedance devices are thus magnetized in the same way as by the actual load current of the converter flowing through the contactors. This has the result that the delay in magnetic reversal of the switching impedance device, which would otherwise be missing under no-load conditions of the converter, is effected by the additional exciting circuit. The advantage of the arrangement is that the dummy load resistance can be proportioned considerably smaller than what such resistance would otherwise have to be if arranged in the main converter circuit, thus resulting in a correspondingly smaller unproductive load loss.

The foregoing object and other advantages inherent in the inventive concept will become more evident from the following description of one practical embodiment thereof and from the accompanying drawings.

In these drawings:

Fig. 1 is an electrical schematic diagram illustrating the improved converter arrangement, and Figs. 2a–2e is a presentation of several graphs showing the operating characteristics.

With reference now to Fig. 1 in particular, the three phases of the alternating current supply mains are indicated at 1. Alternating current power is taken from the mains 1 through a main three phase circuit breaker 2 and is applied to the primary of a main three phase transformer 3. The three phase secondary of transformer 3 is connected through two sets of triple main contactors 4 and a switch 6 to the direct current mains 7 which supply the direct current load. The contactors 4 are actuated periodically to their opened and closed positions and in proper sequence related to their particular phase of the alternating current supply by means of a motor device, not shown.

Switching impedance devices 5 of the inductive type are arranged in circuit between each phase of the alternating current supply source 1 and the corresponding contactor device 4. Each such impedance includes a magnetic circuit 5a, a main winding 18 connected in series between the corresponding phase on the secondary of transformer 3 and the corresponding contactors 4, and two exciter or bias windings 8 and 11. The exciter windings 8 are supplied with alternating current of the proper phase from a variable phase inductor regulator 9 and locking impedance coils 10. The exciter windings 11 are supplied with power from the alternating current mains 1 through a variable phase induction regulator 14 and a three phase transformer 15, the exciter windings 11 being arranged in the secondary circuit of transformer 15 and including rectifier devices 12 and a common adjustable dummy load resistance 13 connected in series therewith. Also, in order to avoid effects of the load current on the auxiliary exciting circuit of the switching impedance devices, a locking impedance coil 16 is also arranged in series with the dummy load resistance 13. This prevents the formation of additional induction currents. The circuit arangement is such that all currents flowing through the rectifiers 12 pass together through the dummy load resistance 13. The current in resistance 13 is thus an uninterrupted direct current. The latter can be used for other purposes, for example, for the bias magnetization of an impedance device in the direct current circuit of the converter. Such an impedance device is composed of an inductive winding 17a in the direct current circuit between the contactors 4 and switch 6, and a second winding 17b inductively coupled to winding 17a and which is arranged in series with the adjustable dummy resistance load 13 and locking impedance 16. The impedance device 17a—17b serves to prevent backward currents during decreases in the mains voltage. The direct current impedance coil generates a positive current step during a drop in the mains voltage during which the switch 6 is released so that arcing back of the converter is avoided.

The mode of operation of the improved converter arrangement is shown graphically by the various curves in Figs. 2a–2e which show the course of the fluxes and currents in the switching impedance devices 5. The plot in Fig. 2a represents the closing period of two successive contacts of the converter contactors 4. In the range $\Delta t$ the two contacts overlap and commutation must take place during this period. The magnetic flux in the switching impedance device 5 belonging to the breaking contactor must then still be positive during this period, so that the low current interval can be established. The plot in Fig. 2b shows the magnetic flux $\phi_0$ which would be formed at no-load without the provision of an additional excitation according to this invention. One can see in such case that the reversal of the magnetic flux in the switching impedance device 5 to unsaturate it takes place in advance of the commmuation time $\Delta t$. During the commutation, the magnetic structure of the switching impedance device becomes saturated again in the reverse direction and no low-current interval can be formed. The plot in Fig. 2c shows the course of the exciting current $J_H$ in the additional exciting circuit according to the present invention which flows through the auxiliary rectifiers 12 and the base or dummy load resistance 13. The additional exciter current prevents reversal of the flux in the device 5 before the commutation period $\Delta t$. This has the result that the magnetic flux reversal of the switching impedance device 5 is delayed until the start of the overlapping period of the contactors, even at no-load. The resulting flux course $\phi_L$ of the impedance device 5 at no-load is shown in Fig. 2d. The magnetic flux reversal in the switching impedance device 5 is desirably effected according to Fig. 2d only during the overlapping period of the contactors. At the time of the contactor overlapping there is a short circuit between the various phases of the transformer, in which a short circuit current can be generated only if both switching impedance devices of the short circuit are pre-saturated in the direction of the rising short circuit current. Due to the delay in the magnetic flux reversal of the switching impedance devices 5 effected by the additional exciting circuit thereof including the dummy load 13, the switching impedance device 5 corresponding to the opening contact is saturated at the start of the overlapping period of the contactors in the opposite direction to the short circuit current and therefore has a high impedance during the overlapping. The short circuit current $J_K$ plotted in Fig. 2e is therefore greatly limited and can be formed only when the additional winding 11 on the switching impedance device has been magnetically reversed, i.e. after the overlapping contactor period $\Delta t$. The breaking of the contactors therefore takes place as long as there is only a small backward current, which can also be interrupted without arcing back.

The phase displacement of the bias current fed to the additional windings 11 on the switching impedance devices is so selected by adjustment of the regulator 14 that the bias magnetization of the switching impedance device 5 is not influenced at the time the circuit is closed. This can be seen from Fig. 2c where the magnetizing current $J_H$ starts later than the closing of the circuit by the respective contact (time $t_E$).

In conclusion, while one practical embodiment of the invention has been described and illustrated, it is to be understood that various minor changes may be made in the circuit organization without, however, departing from the spirit and scope of the invention as defined in the appended claims.

I claim:

1. In an electrical converter of the contactor type the combination comprising an alternating voltage supply mains, a converter circuit connected to said supply mains, said converter circuit comprising contactor means adapted for synchronous operation with said alternating voltage supply mains, and a saturable switching impedance device having a main winding series connected with said contactor means between the latter and said alternating voltage supply mains for producing a current step down near the current zero value of said alternating voltage supply mains and an auxiliary winding for producing a magnetic biasing effect on said switching impedance device, said auxiliary winding being connected in an exciter circuit including a dummy load resistance and rectifier means effecting a current flow in said auxiliary winding to magnetize said impedance device in the same direction as is effected by the flow of the load current through said main winding.

2. An electrical converter as defined in claim 1 and which includes a variable phase regulator energized from said alternating voltage supply mains and which is connected to said exciter circuit for supplying power thereto.

3. An electrical converter as defined in claim 1 wherein an impedance device is connected in said converter circuit on the direct current load side of said contactor means, and means biasing said impedance device by the current flowing in said exciter circuit.

4. An electrical converter as defined in claim 1 and which further includes a locking impedance device connected in said exciter circuit.

5. An electrical converter as defined in claim 1 wherein said rectifier means in said exciter circuit are fed in phase displacement relative to the contactor current such that the bias magnetization produced by said auxiliary winding on said switching impedance device does not destroy the magnetic state of said switching impedance device during the time that the converter circuit is closed by said contactor means.

References Cited in the file of this patent

UNITED STATES PATENTS

| 2,276,784 | Koppelmann | Mar. 17, 1942 |
| 2,769,951 | Kleinvogel | Nov. 6, 1956 |
| 2,817,805 | Diebold | Dec. 24, 1957 |
| 2,883,603 | Dortort | Apr. 21, 1959 |

FOREIGN PATENTS

| 1,004,276 | Germany | Mar. 14, 1957 |